Patented Aug. 15, 1933

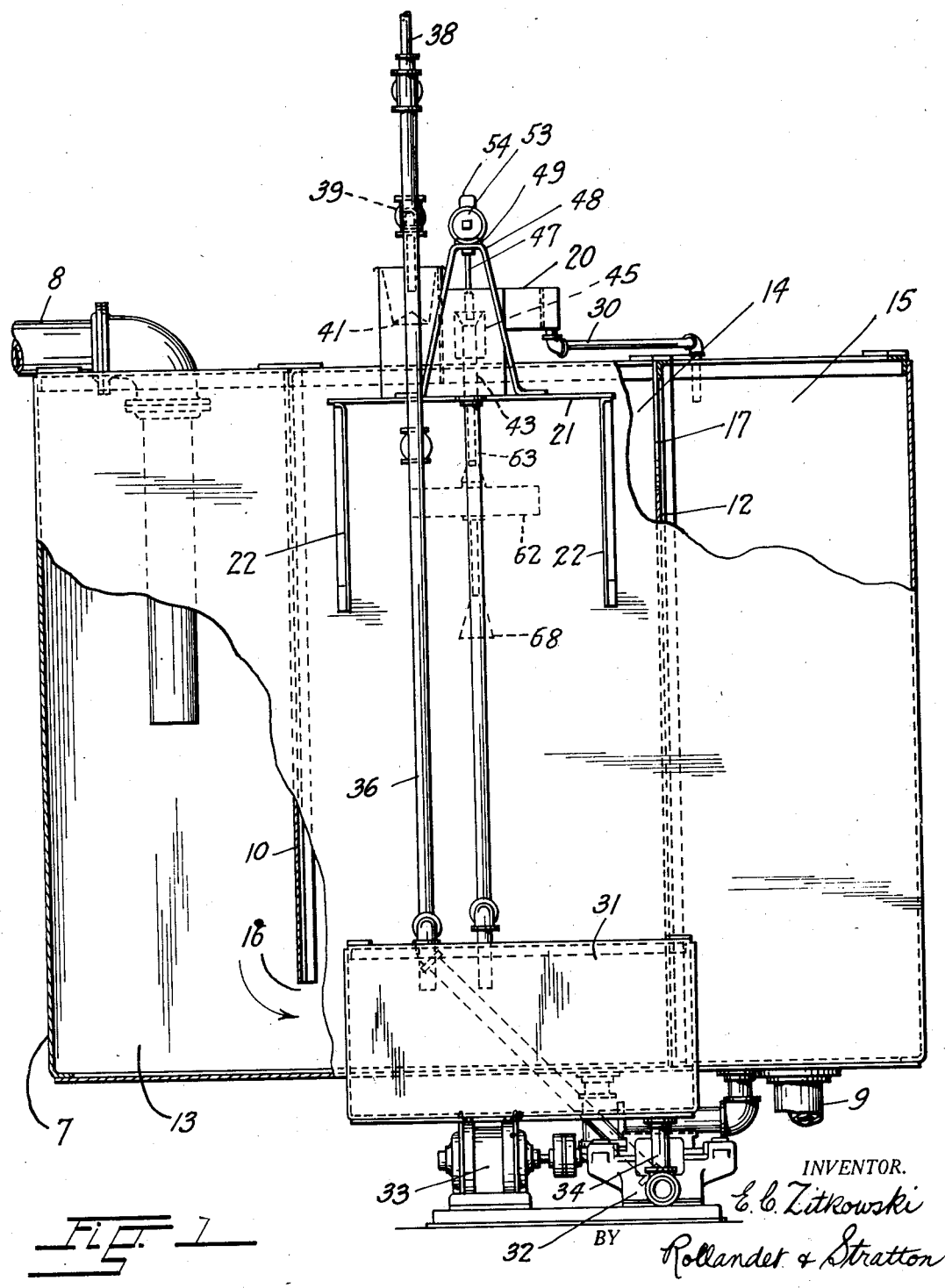

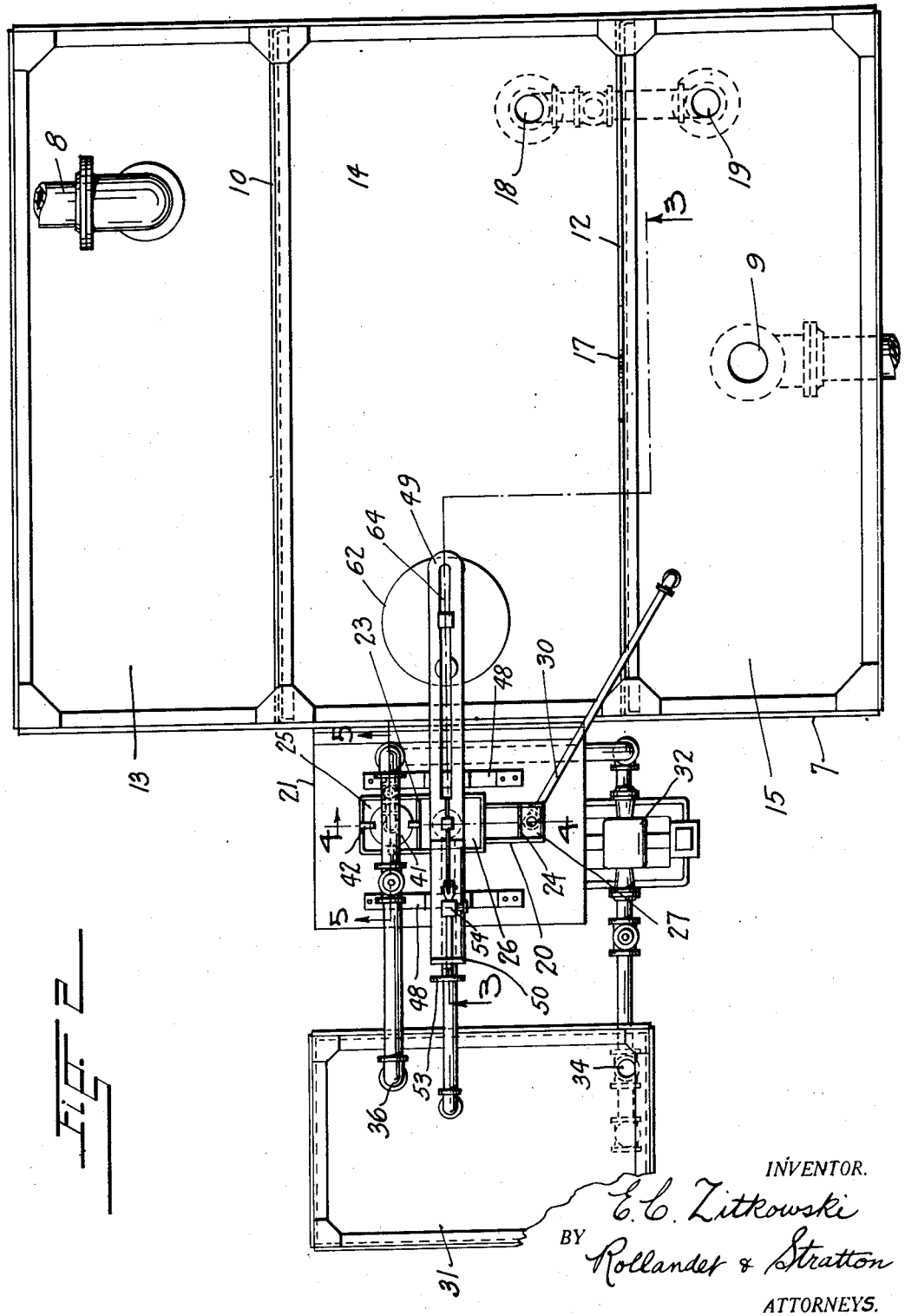

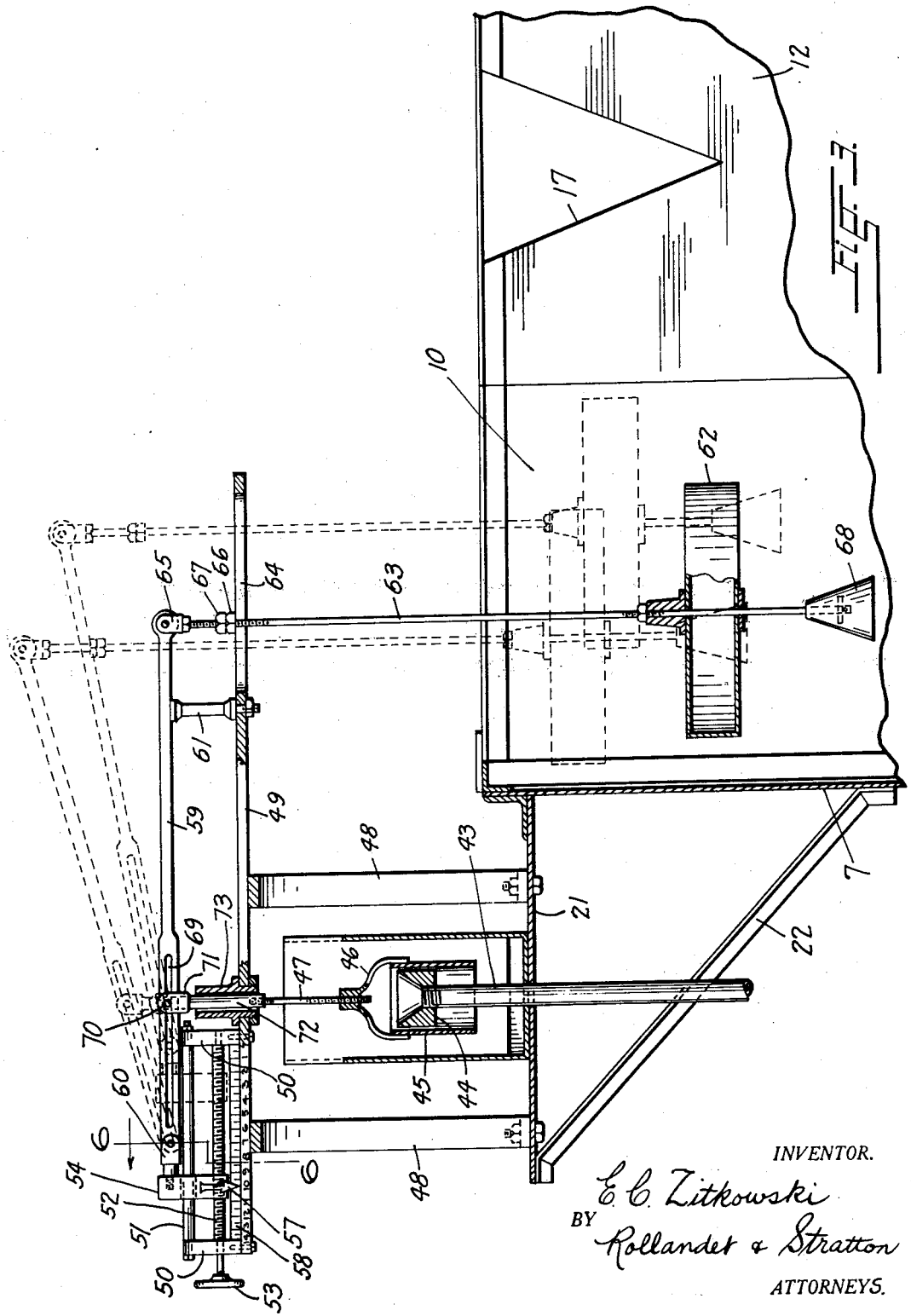

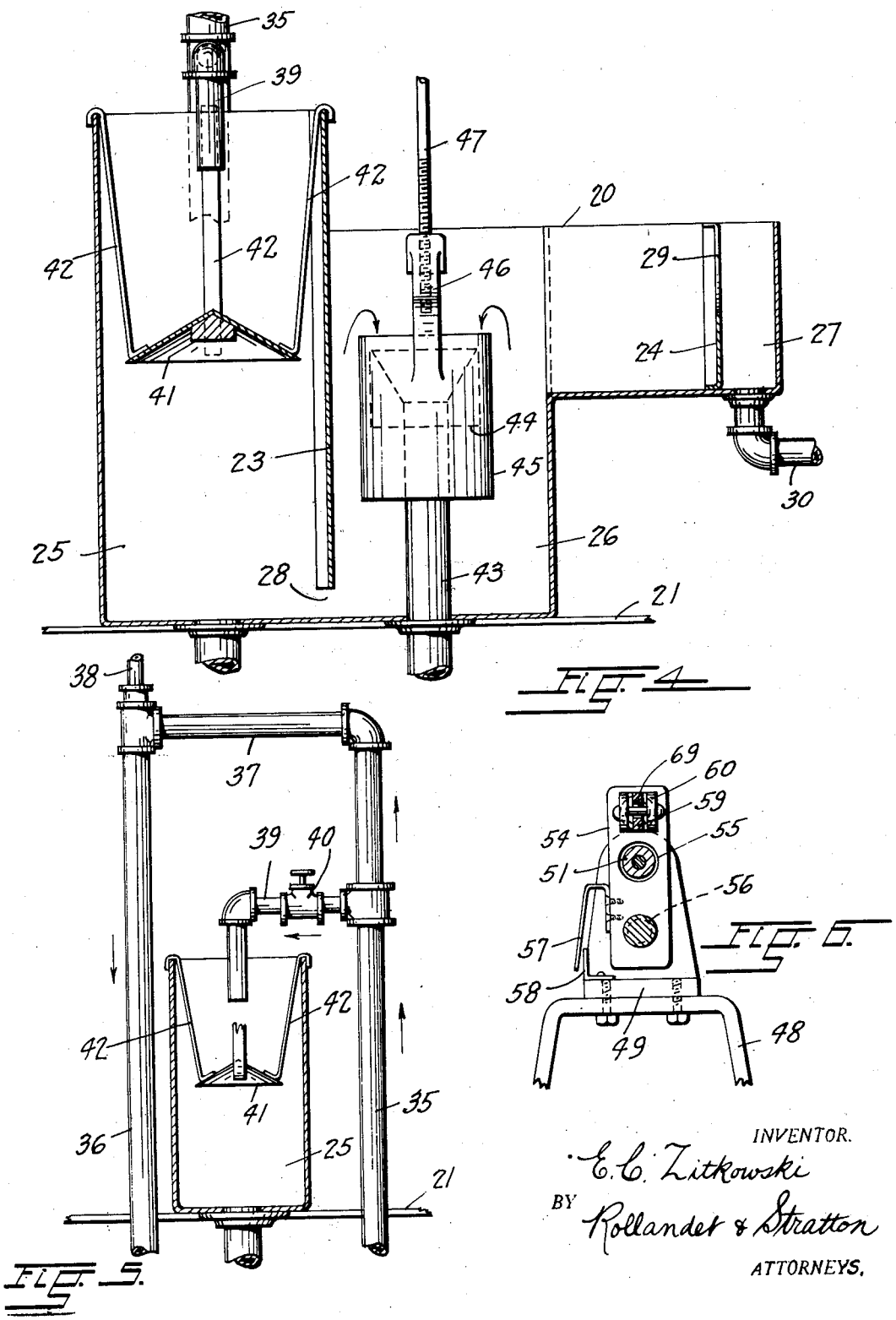

1,922,411

UNITED STATES PATENT OFFICE 1,922,411

AUTOMATIC CONTINUOUS LIMING DEVICE

Emil Carl Zitkowski, San Fernando, P. I.

Application April 7, 1930. Serial No. 442,198

11 Claims. (Cl. 127—14)

My invention relates to liming devices. The principal object is to provide a device that automatically and continuously feeds the proper proportion of a liquid, such as milk of lime, to a continuous, varying flow of material, such as to a flow of sugar cane juice in the process of making cane sugar.

In the manufacture of cane sugar it has been found that liming of the cane juice must be accurately done in order to obtain the best results and that a homogeneous mixture of lime and juice before heating is of great importance.

Heretofore, the milk of lime has been added in a batch process, and since large quantities must be treated, the effect has been that part of the juice is overlimed, giving rise to difficulties later on in the process.

It is an object of my invention to provide a device for continuous liming, whereby the proper amounts of a chemical reagent such as milk of lime and the juice are thoroughly and quickly mixed in a continuous flow in order to overcome the aforementioned difficulties.

In order that the proper amount of milk of lime may be introduced, it is an object of the invention to automatically regulate the flow of the milk of lime by the flow of the juice, without the use of valves.

A still further object is to provide means for changing the ratio between the amount of milk of lime and the amount of juice.

Other objects reside in providing simple and efficient means for carrying out the foregoing results.

Other objects will appear in the course of the following description and are carried out by novel details of construction and by novel combinations and arrangements of parts, hereinafter to be described.

In the drawings like reference characters designate similar parts in the several views.

Figure 1 is a broken elevation of a device embodying the foregoing objects.

Figure 2 is a plan view of said device.

Figure 3 is an enlarged section taken on the line 3—3 of Figure 2.

Figure 4 is an enlarged section taken on the line 4—4 of Figure 2.

Figure 5 is an enlarged section taken on the line 5—5 of Figure 2.

Figure 6 is an enlarged section taken on the line 6—6 of Figure 3.

Referring more specifically to the drawings, a mixing tank 7 comprised in the invention has an inlet pipe 8 and an outlet pipe 9 and has partitions 10 and 12 dividing the tank into compartments or chambers 13, 14 and 15. The partition 10 is spaced from the bottom of the tank to provide a passage 16. The partition 12 provides a weir for the tank and has a V-shaped overflow 17, whereby juice from compartment 14 flows into compartment 15. Drains 18 and 19 are provided for the compartments 14 and 15 respectively for the discharge of wash water. Suitable valves are employed in these drains.

A lime meter box 20 is provided on a platform 21 supported by brackets 22. The lime box 20 has partitions 23 and 24, providing compartments or chambers 25, 26 and 27. The partition 23 is spaced from the bottom of the lime box to provide a passage 28 between compartments 25 and 26, and the partition 24 provides a weir for the box and has a V-shaped overflow 29 between compartments 26 and 27. A pipe 30 drains compartment 27 of the lime meter box and empties into compartment 15 of the comparatively large juice tank.

Lime is pumped from a supply tank 31 by a pump 32 actuated by a motor 33. The pump draws liquid from the supply tank through a stub-pipe 34 and forces the liquid into a circulating system comprising parallel, vertical pipes 35 and 36, connected by a cross-pipe 37. A vent for the system is provided at 38. The liquid is raised in the pipe 35, and returns to the supply tank by the pipe 36.

A portion of the liquid raised in the pipe 35 flows therefrom through an outlet pipe 39 into compartment 25 of the lime box. The outlet pipe 39 is controlled by a valve 40. Milk of lime from the pipe pours on to a spreader 41 supported under the outlet of outlet pipe 39 by arms 42 hooked over the edge of the walls of the compartment 25.

In compartment 26 an adjustable overflow pipe 43 is provided for determining the level of milk of lime in the lime meter tank. The pipe 43 returns overflowing liquid to the supply tank. An internally tapering collar 44 is screwed to the upper extremity of the overflow pipe. An adjustable sleeve 45 has a slip fit with the collar 44. A bail 46 for the sleeve 45 has a threaded connection with a supporting rod 47.

Operating means for raising and lowering the sleeve 45, whereby to raise and lower the level of milk of lime in compartment 26, is supported on legs 48 on the platform 21. Such means comprise a bar 49 supported on the legs and bearings 50 bolted on the bar.

A slide rod 51 is mounted between the bearings 50. A screw 52 is rotatably supported in the bearings 50, and has a hand wheel 53 on a projecting portion.

A movable head 54 has a smooth opening 55 and a threaded opening 56. The rod 51 projects through the smooth aperture whereby the head slides on the rod and the screw 52 is in engagement with the threads in the other opening 56. Thus rotation of the screw 52 advances or retracts the head 54, depending upon the direction of rotation of the screw. The head 54 carries a pointer 57 that cooperates with a graduated scale 58 on the bar, 49, to measure the amount of lime introduced into the juice.

A lever 59 is pivotally mounted on a projecting arm 60 on the head 54. A standard 61 on the bar 49 supports the lever 59 during inaction of the present device, or when the juice drops to a predetermined level. A float 62 is pivotally supported on the projecting end of the lever 59 by a rod 63 projecting through a slot 64 in the bar 49, and screwed into a yoke 65 pivotally fastened to the lever 59. A nut 66 and a lock nut 67 are screwed on the rod 63 to support the rod on the bar 49 at any desired height.

A counter weight 68 is fixed on the end of the rod 63 and tends to draw the float and rod 63 downward. The lever 49 has a slot 69 in which slides a pin 70 that holds a yoke 71 fastened at an end of a connecting shaft 72, which in turn has a threaded connection with the rod 47, supporting the sliding sleeve 45. A guide 73 is provided on the bar 49 for the connecting shaft 73.

In the operation of the present apparatus, the motor for the pump is started, which causes the milk of lime to circulate through the pipes 35, 36 and 37. Lime thereby pours through the outlet-pipe 39 and on to the spreader 41, which permits the entrance of fresh milk of lime into the meter box with the minimum disturbance of the lime already therein.

The lime finds its level in the compartments 25 and 26, and any excess overflows into the pipe 43 and is returned to the supply tank. Raw cane juice is admitted to the compartment 13 of the juice tank through the pipe 8.

The juice finds its level in compartments 13 and 14. When the juice rises to a predetermined level, such as when the juice begins to flow over the weir 12 into compartment 15, the float is raised. Thus the sliding sleeve 45 is raised through the intermediary of the lever 59 connected with the float, which raises the level of the lime whereby it overflows into compartment 27 over the weir 24 and is carried by pipe 30 to compartment 15 containing the juice.

As the quantity of juice in the compartment 14 increases, the level of the lime is raised, so that increasing amounts of both lime and juice are fed into mixing compartment 15 in direct ratio. Just the opposite operation is effected by a decreasing flow of juice, and the weight 68 tends to lower the float, cutting down the supply of lime.

The ratio of the amount of lime to the amount of juice may be varied by rotating the hand wheel 53. The scale 58 provides a means for measuring the change in such ratio.

The mixture of the lime and juice is then carried by the pipe 9 to the next element in the process of refining the sugar, to wit, a clarifier (not shown).

It will be clear from the foregoing that the flow of juice automatically controls the amount of milk of lime that is introduced therein, and that the ratio of the amount of lime to the amount of juice may be varied to suit different needs.

Changes may be made in details of construction and in the arrangements of parts without departing from the spirit of the invention. Moreover, I do not desire to be limited to the exact details and arrangements shown, except as specifically stated in the hereunto appended claims.

What I claim:

1. In apparatus for the purpose described, a tank adapted to be placed in a flow line of sugar cane juice, a lime box, means adapted to supply lime to said box, continuously, mechanism connected to regulate the level of the lime in the lime box by the quantity of juice in the tank, and means adapted to convey lime from the box to the tank when the lime in the box has reached a predetermined level.

2. In apparatus for the purpose described, a tank adapted to be placed in a flow line of sugar cane juice, a lime box, means adapted to supply lime to said box continuously, mechanism to regulate the level of the lime in said box, a float in the tank connected to operate said mechanism when juice in the tank has risen to a predetermined level, and means to convey lime from the box to the tank when the lime in the box has reached a predetermined level.

3. In apparatus for the purpose described, a tank adapted to be placed in a flow line of sugar cane juice, a lime box, means adapted to supply lime to said box continuously, an adjustable overflow pipe regulating the level of the lime in the box, a float in the tank controlling the height of said overflow pipe, and means to convey lime from the box to the tank when the lime in the box has reached a predetermined level.

4. In apparatus for the purpose described, a tank adapted to be placed in a flow line of sugar cane juice, a lime circulating system, a lime box, a connection to supply lime from the system to the box continuously, an adjustable overflow determining the liquid level in the box, connected to return overflowing lime back into the system, a connection adapted to convey lime from the box to the tank when the lime in the box has reached a predetermined level, and mechanism to operate said adjustable overflow by the quantity of juice in the tank.

5. In apparatus for the purpose described, a tank for raw juice, means connected with a source to continuously supply lime to the tank, a float in tank, a movable head, a lever connecting the float, controlling said means and fulcrumed on the head, and screw means connected to move the head and thereby the lever relative to said means whereby to vary the ratio of the quantity of lime fed into the tank to the quantity of juice in the tank.

6. In apparatus for the purpose described, a tank adapted to be placed in a flow line of sugar cane juice, a lime box, means for continuously supplying lime to the box, the box having a weir providing an overflow, means controlling the level of lime in the box, a float in the tank connected with said means to automatically select said levels and a connection to receive and conduct lime that overflows the weir to the tank.

7. In apparatus for the purpose described, a tank adapted to be placed in a flow line of sugar cane juice, a lime box provided with a weir overflow, means to maintain certain liquid levels in the lime box relative to the overflow, a float in the tank connected with said means to automatically select said levels, and a connection to receive liquid overflowing the weir and to convey said liquid from the box to the tank.

8. In apparatus for the purpose described, a tank adapted to be placed in a flow line of sugar cane juice, a lime box provided with a weir overflow, means to receive and convey to the tank liquid overflowing from the box, mechanism to continuously supply lime to the box, adjustable means defining the liquid level in the box relative to the overflow, a float in the tank connected with the last-mentioned means to automatically select said levels, and a scale relative to which the last-mentioned means is adjusted.

9. In mixing apparatus, a tank placed in the flow line of a liquid, a chemical reagent box fed by a source of supply, an overflow return conduit connecting the box with the source, the conduit having an adjustable intake, mechanism to raise and lower the intake comprising a float in the tank and a lever connecting the float with the intake, and means to convey the reagent from the box to the tank when the reagent in the box reaches a predetermined level.

10. In mixing apparatus, a tank placed in the flow line of a liquid, a chemical reagent box fed by a source of supply, an overflow return conduit connecting the box with the source, the conduit having an adjustable intake, mechanism to raise and lower the intake comprising a float in the tank and a lever connecting the float with the intake, an adjustable fulcrum for the lever to vary the ratio of reagent to liquid, and means to convey the reagent from the box to the tank when the reagent in the box reaches a predetermined level.

11. In apparatus for treating liquids, a tank placed in the flow line of a liquid, a chemical reagent box, means adapted for the continuous supply of reagent to the box, mechanism connected to automatically regulate the level of the reagent in the reagent box by the quantity of liquid in the tank, and means adapted to convey reagent from the box to the tank when the reagent in the box has reached a predetermined level.

EMIL CARL ZITKOWSKI.